Sept. 11, 1962 R. L. SPIELES 3,053,960
DIELECTRIC PROCESS AND APPARATUS FOR FORMING MATERIALS
Filed Nov. 26, 1958 2 Sheets-Sheet 1

INVENTOR.
Robert L. Spieles
BY
Paul J. Reising
ATTORNEY

Sept. 11, 1962   R. L. SPIELES   3,053,960
DIELECTRIC PROCESS AND APPARATUS FOR FORMING MATERIALS
Filed Nov. 26, 1958   2 Sheets-Sheet 2

INVENTOR.
Robert L. Spieles
BY
Paul J. Reising
ATTORNEY

United States Patent Office 3,053,960
Patented Sept. 11, 1962

3,053,960
DIELECTRIC PROCESS AND APPARATUS FOR FORMING MATERIALS
Robert L. Spieles, St. Clair Shores, Mich., assignor to General Motors Corporation, Detroit, Mich., a corporation of Delaware
Filed Nov. 26, 1958, Ser. No. 776,536
9 Claims. (Cl. 219—10.53)

This invention relates to a process and apparatus for simultaneously cutting and dielectric embossing material for use as automobile upholstery and the like.

In the process of dielectric embossing the material to be embossed is pressed between two electrodes, the surface of one of which is contour with the design desired to be imparted, while high frequency alternating voltage is applied to generate heat with the material. This process is used to manufacture decoratively embossed automobile upholstery comprising a trim material, such as cloth or a flexible thermoplastic, positioned on a fibrous or foam pad which is made of or impregnated with a heat fusible plastic and is supported on a fiberboard backing. Upon operation of the dielectric press an embossed pattern is produced wherein the trim material is bonded to the backing through the pad, the plastic in the pad along the embossed lines having been melted and cured, thus serving as the bonding adhesive. In practice, the frequency used for the dielectric heating is in the range of 2 to 200 megacycles per second. Copending United State patent applications Serial No. 538,914 now Patent No. 2,946,713, filed October 6, 1955 in the names of Peter P. Dusina, Jr. and Ralph M. Stallard; Serial No. 648,654 now Patent No. 2,991,216 filed March 26, 1957 in the names of Ming C. Hsu and Ralph M. Stallard; Serial No. 702,653, filed December 13, 1957 in the name of Ralph M. Stallard; Serial No. 651,356 now Patent No. 2,914,109 filed April 8, 1957 in the names of Ming C. Hsu and Ralph M. Stallard; and Serial No. 737,812 now Patent No. 2,922,865, filed May 26, 1958 in the names of Wilburn A. Schattler and Ralph M. Stalard; all of which are assigned to the assignee of the present invention, relate to such processes.

With all such prior dielectric embossing processes, it has been necessary prior to assembly of the embossed material as interior trim of the vehicle, to utilize a separate cutting operation in order to provide various required openings through the material and to finish the peripheral edges. For example, in the manufacture of interior panels for vehicle doors, openings must be cut for the insertion of door handles, decorative metal medallions or the like and other hardware.

It is an object of the present invention to provide an apparatus and process whereby material may be simultaneously cut and dielectrically embossed, all in the same operation, thereby effecting a substantial improvement in manufacturing efficiency and commensurately lower manufacturing costs. More specifically, it is an object of the present invention to provide a process, and apparatus for same, wherein the material to be processed is positioned in a dielectric press having a pair of electrodes one of which is die formed with dielectric embossing blades and with the desired cutting edges, the press additionally having means to prevent any arcing between the cutting edges and the other of the electrodes. These and other objects and advantages of the invention will appear more fully from the following detailed description of a preferred embodiment made with reference to the appended drawings in which:

Figure 1:
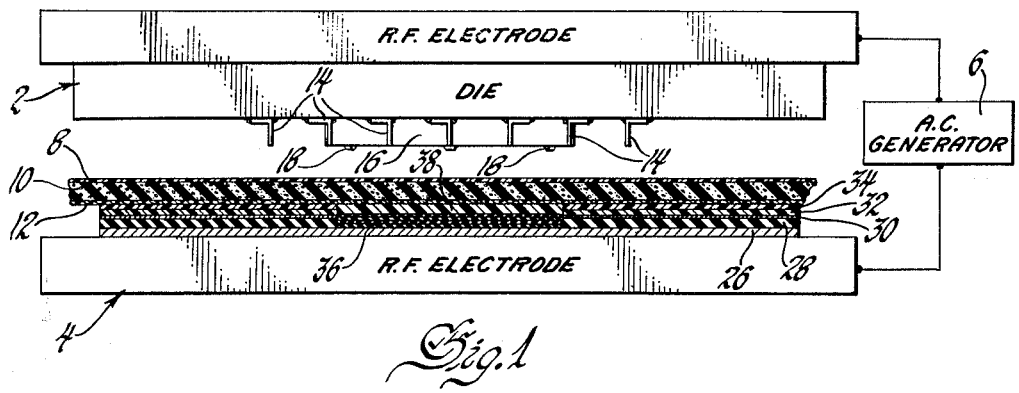
FIGURE 1 is a side view in partial section of a preferred embodiment to the invention.
Figure 2:
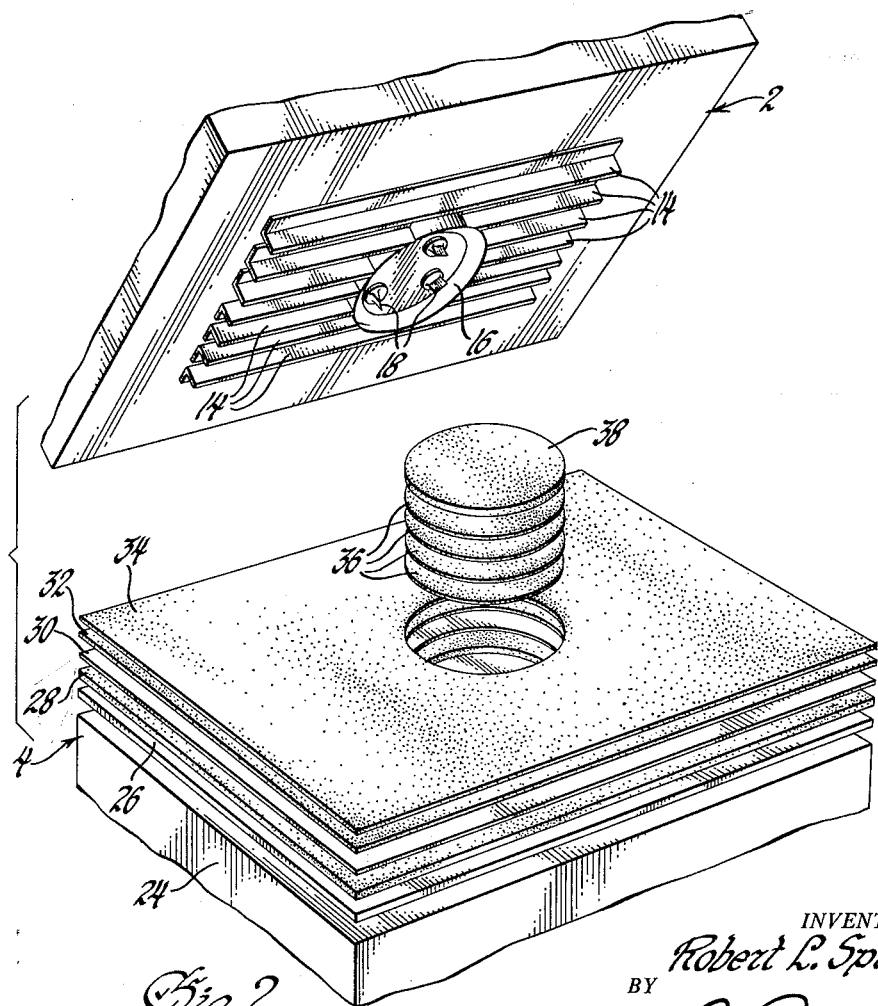
FIGURE 2 is an exploded view of portions of the apparatus shown in FIGURE 1, the upper electrode member being shown in perspective.
Figure 3:
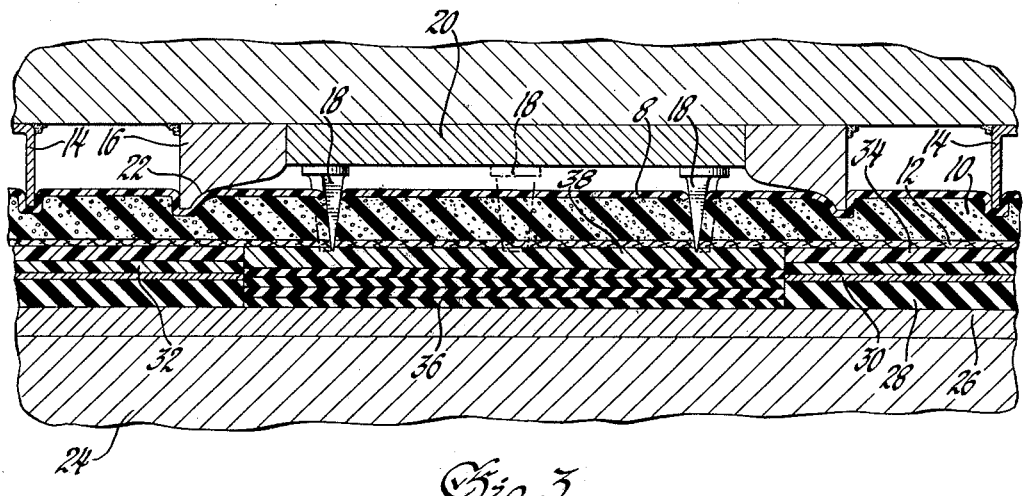
FIGURE 3 is a side view in section of a portion of the apparatus shown in FIGURE 1 but with the electrodes brought together in embossing and cutting relationship.

Referring now particularly to FIGURES 1 and 2, the apparatus comprises a press having upper and lower metal electrodes 2 and 4, respectively, in series with a high frequency generator 6. Between the electrodes is a laminated assembly comprising a sheet 8 of cloth or thermoplastic material such as polyvinyl chloride or the like positioned on a layer 10 of sponge rubber or resin-impregnated fibrous or felt riser material and a paper or cloth backing sheet 12. The upper electrode is formed to serve as an embossing die by way of a plurality of metal embossing blades 14 thereon which are arranged to impart the desired pattern or design to the trim assembly by application of pressure and heat upon closing of the press and actuation of the high frequency generator. An annular metal embossing blade 16 is positioned adjacent the center of the electrode such that it intersects a number of the straight embossing blades 14. All of these embossing blades project outwardly from the surface of the electrode to the same extent so that their free ends are in the same plane. Within the confines of the annular embossing blade 16 are three pins 18, the outer ends of which extend slightly below the plane defined by the ends of the embossing blades and are sharpened to serve as mechanical cutting edges. As can best be seen in FIGURE 3, the cutting pins 18 are secured to a metal disc 20 which fits snugly within the annular embossing blade 16, the embossing blade and disc in turn being secured to the base member of the electrode as by welding. Also, as can be seen in FIGURE 3, the inner surface of the annular embossing blade has a concave, generally spherical shape, as shown at 22, such that the embossed pattern imparted to the trim assembly by this blade forms a conforming smooth convex surface as shown.

The lower electrode 4 comprises a flat metal base member 24 having positioned over its upper surface an aluminum locating plate 26, a layer of butyl rubber 28, an aluminum shimming plate 30, and two layers 32 and 34 of silicone rubber or, preferably, of a mixture of barium titanate and silicone rubber, as covered by the aforementioned United States patent application Serial No. 737,812 now Patent No. 2,922,865. The circular center portions in layers 28, 30, 32 and 34 are removed and replaced with a plurality of silicone rubber shims 36 and a circular insert 38 of polytetrafluorothylene, the total thickness of the shims being such that the upper surface of the polytetrafluoroethylene insert is in the plane of the upper surface of the top layer 34 on the electrode. Further, the diameter of the insert 38, and also of the silicone rubber shims, is somewhat less than the interior diameter of the outer projecting end of the annular embossing blade 16, the insert and shims being axially aligned or concentric with said annular embossing blade as best shown in FIGURE 3. The cutting pins 18, being located within the confines of the annular cutting blade, are thus positioned opposite the insert 38 such that when the electrodes are brought together they engage the surface of said insert.

The primary function of the insert 38 is to prevent any arcing between the bottom electrode and the metal cutting pins. Thus, it is essential that the insert have a high dielectric strength so as to provide good electrode insulation between the cutting pins and the bottom electrode. Also, to assure against electrical breakdown with resultant arcing during prolonged operation of the press, we have found it essential that the insert be of a material which has a nonpolar molecular structure, i.e., a power factor of less than .001, such that it cannot be heated dielectrically. Hence, in the area of the cutting pins there is no heating of either the work material or the insert. In addition to having good dielectric strength and a very low power factor, the insert should be mechanically tough and shock resistant with good resiliency and abrasion resistance to withstand scuffing or cracking from repeated contact by the cutting pins. We have found that polytetrafluoroethylene is by far the preferred material for the insert in that it provides all of these properties to the extent required for long and continuous efficienct operation of the press. Other materials which are satisfactory for the insert are, for example, polyethylene and polystyrene both of which have good dielectric strength and nonpolar molecular structure. If it is desired to attain better abrasion resistance and other mechanical properties than afforded by the insert material itself, a thin metal plate can be inlayed into the insert in opposed relationship to the cutting edges, the metal plate being completely insulated from the bottom electrode by the insert material. Also, if desired, additional assurance against arcing can be provided by electrically insulating the cutting edges from the upper electrode as, for example, by using an insulating material such as polytetrafluoroethylene for the disc 20.

Figure 4:
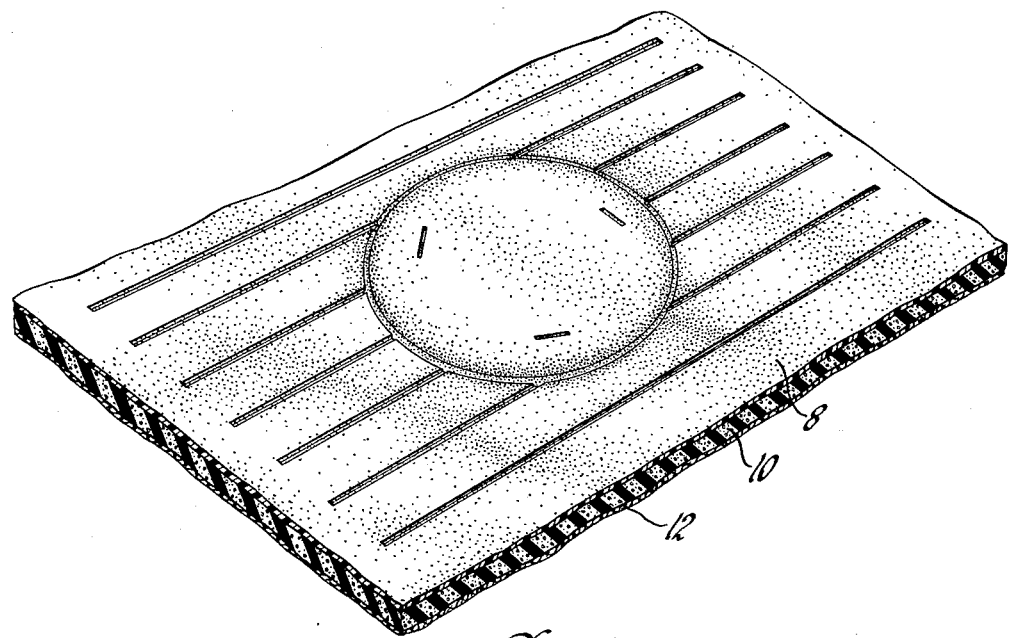
FIGURE 4 is a perspective view of material formed by the process and apparatus illustrated in FIGURE 3.

To practice the process of the invention, the trim assembly to be processed is inserted in a fixed predetermined and taut position between the electrodes and the electrodes are brought together with a pressure on the order of 200 to 800 p.s.i. The cutting pins 18 thereby mechanically pierce the trim assembly, as shown in FIGURE 3, to provide the desired openings, and at the same time the embossing blades engage the assembly to press and dielectrically heat the material and impart the desired embossed pattern. The embossing cycle generally comprises two phases from the time standpoint, the time during which dielectric heating takes place (the heat cycle) and the time that pressure is maintained on the embossed assembly after the heating is accomplished (soak time). A heat cycle of from 6 to 60 seconds at about 13 megacycles per second, 2500 volts, and a hold time of up to 10 seconds are usually satisfactory. The precise times necessary for optimum results will depend on the exact frequency and voltage used, the materials being embossed, the nature of the pattern, etc. The peak temperature reached during the heat cycle may be from 250° F. to 350° F., a temperature of 325° F. being typical. After the soak time is completed, the embossed and pierced assembly is removed and a new assembly inserted. A trim assembly embossed and pierced by the process described is shown in FIGURE 4. The piercing in this particular embodiment is for the purpose of securing to the trim assembly a decorative medallion (not shown) by means of metal tabs.

It will be obvious that the invention has utility for performing various types of cutting operations other than that shown. For example, it may be used, with appropriately shaped cutting blades in place of the pins shown, to cut circular holes or the like for the placement of door handles, moldings and similar hardware, or it may be used with cutting blades secured along the die edges to trim away peripheral edge portions of the work material and thereby provide the embossed assembly with the final shape desired. Thus, though the detailed description has been with reference to a particular embodiment thereof, it will be understood that other embodiments and modifications may be used, all within the full and intended scope of the claims which follow.

I claim:

1. Apparatus for cutting and dielectrically embossing a flexible sheet containing a heat-fusible material comprising a pair of opposed electrodes connected in series with a high frequency electrical generator, a portion of the surface of one of said electrodes having at least one embossing blade thereon and another portion with at least one sharp mechanical cutting edge, the surface of the other of said electrodes having an insert therein comprising a body of electrical insulating material with a nonpolar molecular structure, said insert being in opposed relationship to said cutting edge and being of sufficient thickness to prevent current flow between said electrodes in the area of the sheet bounded by the insert and thereby prevent heating of that portion of said sheet adjacent said cutting edge.

2. Apparatus as defined in claim 1 wherein said insert comprises a body of polytetrafluoroethylene.

3. Apparatus as defined in claim 1 wherein said insert comprises a body of polyethylene.

4. Apparatus as defined in claim 1 wherein said insert comprises a body of polystyrene.

5. Apparatus for cutting and dielectrically embossing a flexible sheet containing a heat-fusible material comprising a pair of opposed electrodes connected in series with a high frequency electrical generator, a portion of the surface of one of said electrodes having a plurality of embossing blades thereon and a center portion with at least one sharp mechanical cutting edge, the surface of the other of said electrodes having an insert therein comprising a body of electrical insulating material with a nonpolar molecular structure, said insert being in opposed relationship to said cutting edge, and being of sufficient thickness to prevent current flow between said electrodes in the area of the sheet bounded by the insert and thereby prevent heating of that portion of said sheet adjacent said cutting edge.

6. Apparatus as defined in claim 5 wherein said insert comprises a body of polytetrafluoroethylene.

7. Apparatus for cutting and dielectrically embossing a flexible sheet containing a heat-fusible material comprising a pair of opposed electrodes connected in series with a high frequency electrical generator, one of said electrodes having a continuous embossing blade projecting outwardly from the surface thereof and at least one sharp mechanical cutting edge projecting outwardly from the surface bounded by said continuous embossing blade, and the other of said electrodes having a polytetrafluoroethylene insert in the surface thereof in opposed relationship to said cutting edge, said insert being of sufficient thickness to prevent current flow between said electrodes in the area of the sheet bounded by the insert and thereby prevent heating of that portion of said sheet adjacent said cutting edge.

8. Apparatus for cutting and dielectrically embossing a flexible sheet containing a heat-fusible material comprising a pair of opposed electrodes connected in series with a high frequency electrical generator, a plurality of embossing blades projecting outwardly from the surface of one of said electrodes, one of said embossing blades being of circular shape, at least one sharp mechanical cutting edge projecting outwardly from the surface of said one electrode bounded by the circular embossing blade, and the other of said electrodes having a polytetrafluoroethylene insert therein in opposed relationship to said cutting edge, said insert being of sufficient thickness to prevent current flow between said electrodes in the area of the sheet bounded by the insert and thereby prevent heating of that portion of said sheet adjacent said cutting edge.

9. Apparatus for cutting and dielectrically embossing a flexible sheet containing a heat-fusible material comprising upper and lower electrodes connected in series with a high frequency electrical generator, a circular embossing blade and a plurality of other embossing blades extending outwardly from the surface of the upper electrode, the free ends of all of said embossing blades being in the same plane, at least one sharp mechanical cutting edge extending outwardly from the surface of the upper electrode beyond the plane defined by the free ends of said embossing blades, said cutting edge being located within the surface bounded by said circular embossing blade, and an insert in the lower electrode in opposed relationship to said cutting edge, said insert comprising an upper surface layer of polytetrafluoroethylene and at least one layer of silicone rubber under said layer of polytetrafluoroethylene, said insert being of sufficient thickness to prevent current flow between said electrodes in the area of the sheet bounded by the insert and thereby prevent heating of that portion of said sheet adjacent said cutting edge.

References Cited in the file of this patent

UNITED STATES PATENTS

| | | |
|---|---|---|
| 2,120,328 | Ferngren | June 14, 1938 |
| 2,304,958 | Rouy | Dec. 15, 1942 |
| 2,589,419 | Moncrieff | Mar. 18, 1952 |
| 2,631,646 | Gannon et al. | Mar. 17, 1953 |
| 2,739,829 | Pedlow et al. | Mar. 27, 1956 |
| 2,895,035 | Peterson et al. | July 14, 1959 |
| 2,922,865 | Schattler et al. | Jan. 26, 1960 |
| 2,941,575 | Malmberg et al. | June 21, 1960 |

OTHER REFERENCES

Yelton: "Teflon—New Resin With Unusual Properties," Plastics and Resins, May 1946, pp. 14–16, 36.